UNITED STATES PATENT OFFICE.

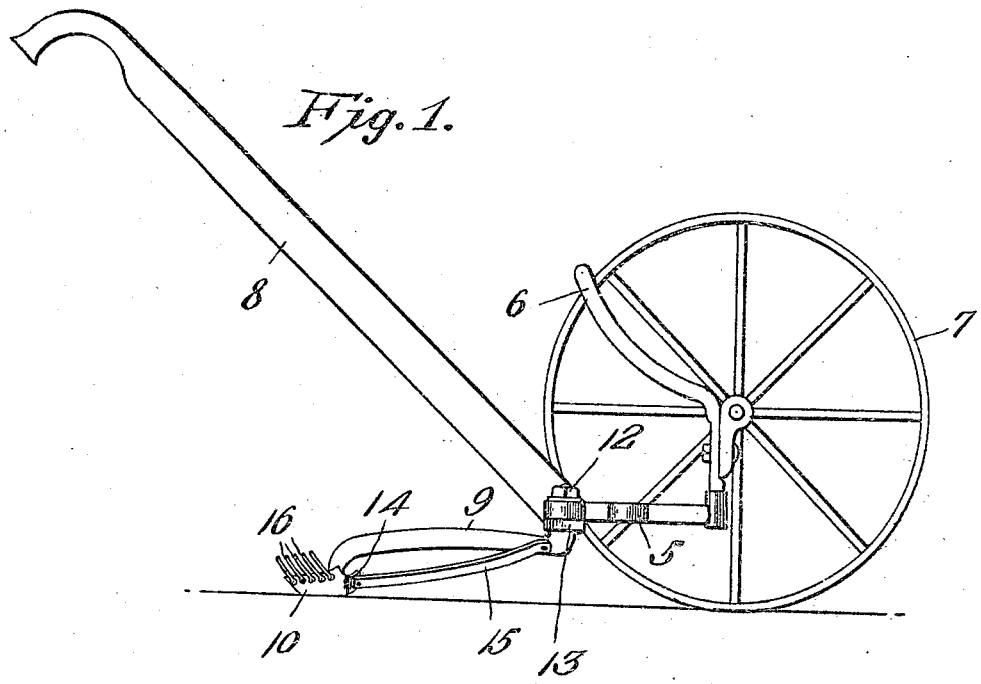
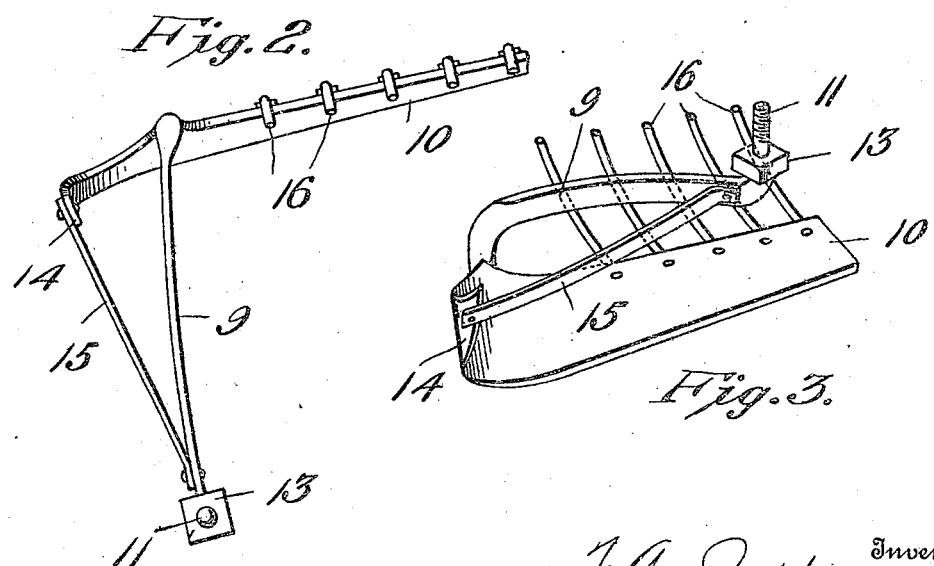

FRED A. ZAPPE, OF PHILBROOK, MINNESOTA.

ONION-PULLING ATTACHMENT.

948,715.  Specification of Letters Patent.  Patented Feb. 8, 1910.

Application filed October 25, 1909. Serial No. 524,454.

*To all whom it may concern:*

Be it known that I, FRED A. ZAPPE, a citizen of the United States, residing at Philbrook, in the county of Todd and State of Minnesota, have invented certain new and useful Improvements in Onion-Pulling Attachments, of which the following is a specification, reference being had to the accompanying drawings.

This invention relates to certain new and useful improvements in agricultural implements and more particularly to an onion puller or harvester and has for its object to provide an attachment which is adapted to be secured to the frame of a garden drill or wheeled hoe, and is of such construction that the onions will be pulled from the ground and discharged from the rear of the device over a plurality of curved tines through which the earth is sifted.

Another object is to provide a very simple attachment of the above character which will remove the onions from their bed and at the same time relieve the same from the particles of earth which cling thereto and deposit them in regular rows so that they may be easily gathered and topped.

With these and other objects in view, the invention consists of the novel construction, combination and arrangement of parts hereinafter fully described and claimed, and illustrated in the accompanying drawing, in which—

Figure 1 is a side elevation of the attachment secured to a drill frame; Fig. 2 is a top plan view of the device removed; and Fig. 3 is a detail perspective view thereof.

Referring to the drawing 5 indicates the drill frame which is secured to the ends of a yoke 6. This yoke straddles a single centrally positioned wheel 7. Handles 8 are secured to the frame 5 by means of which the drill may be moved over the ground. This frame may be otherwise constructed and mounted than as shown in the drawing, and forms no part of the present application.

My improved attachment comprises a shank or beam 9 which is secured at one end of a share plate 10. This plate slightly tapers from its outer to its inner end and when in operative position is disposed at an inclination to the ground surface as clearly shown in Fig. 1. The free end of the beam 9 is vertically extended and formed with a screw threaded stud 11 which is adapted to be disposed in the drill frame 5 and securely retained therein by the nut 12. This end of the beam is also formed with the enlargement 13 which engages with the underside of the frame 5 and forms a convenient wear plate. The outer end of the share 10 is upwardly and inwardly curved or bent as shown at 14. One end of a bar 15 is secured to this curved end of the plate and the opposite end thereof is secured to the forward end of the beam 9. This bar strengthens the share plate 10 and maintains the same rigidly in its operative position. The bar 15 also provides means for breaking the earth clods and preventing the attachment from becoming clogged by the accumulation of the earth between the beam 9 and the share plate.

Secured to the plate 10 adjacent to its rear edge there is a plurality of rods or tines 16 which are slightly curved and are disposed at substantially the same inclination as the share plate. As shown in the drawing five of these rods would preferably be employed although it will be understood that this number may be increased or decreased as may be found desirable.

In the operation of the device, the attachment is secured to the drill or hoe frame and the machine moved over the ground in the usual manner. The lower edge of the plate 10 is disposed slightly beneath the ground surface by forcing down upon the operating handles. As this plate is inclined rearwardly, it will be readily seen that the onions will be removed from their beds and as the machine is forced forwardly they will move rearwardly upon the plate and be disposed upon the tines 16. The continued movement of the machine and the accumulation of additional onions and earth upon the share plate will move the material rearwardly and upwardly upon the tines during which movement the particles of earth which cling thereto will be separated and discharged between the tines or rods, the vegetables being thrown from the rear thereof and deposited upon the ground in parallel rows. They may then be easily and quickly gathered and topped by means of a suitable machine.

From the foregoing it will be seen that I have provided an attachment which may be easily and quickly attached to a wheeled drill or hoe frame, and will quickly and cleanly remove the onions from the earth without injury thereto.

The device is extremely durable in construction and is of such simplicity that it may be produced at a minimum expenditure. While it is particularly adapted for the harvesting of onions, it will be obvious that it may also be employed for gathering beets or other vegetables which grow close to the surface of the ground.

The attachment as above described and illustrated in the accompanying drawing sets forth the preferred embodiment of my invention, although it will be understood that numerous minor modifications may be resorted to without departing from the essential features or sacrificing any of the advantages of the invention.

Having thus described the invention, what is claimed is:

1. In combination, a wheeled frame, a transversely extending share plate having a supporting beam secured adjacent to one end thereof, the forward end of said beam being detachably engaged and supported at an inclination rearwardly of the frame when in operative position, and a plurality of tines secured to the rear edge of said plate extending rearwardly and upwardly therefrom, substantially as and for the purpose set forth.

2. In combination, a wheel supported frame, a share plate transversely positioned in the rear of said frame, a horizontally extending beam secured at its rear end to said share plate, the forward end of said beam having integrally formed therewith a vertically disposed threaded shank, said shank having engagement with said frame and adapted to receive a securing nut to detachably secure the beam thereto, a strengthening bar secured to the end of said share plate and to said beam, and a plurality of upwardly and rearwardly extending tines secured to the rear edge of said plate, substantially as and for the purpose set forth.

3. In combination, a wheel supported frame, a share plate disposed transversely in the rear of the frame and detachably supported therefrom, said plate being operatively disposed at a rearward inclination and having its lower edge engaged with the ground, said plate tapering from its outer to its inner end, and a plurality of tines secured to the rear edge of said plate and extending rearwardly in parallel relation thereto, the rear ends of said tines being upwardly curved, substantially as and for the purpose set forth.

In testimony whereof I hereunto affix my signature in the presence of two witnesses.

FRED A. ZAPPE.

Witnesses:
 HENRY HEINIG,
 IRENE BELTON.